United States Patent
Amrani

(10) Patent No.: US 10,582,000 B1
(45) Date of Patent: Mar. 3, 2020

(54) USING POST-CACHE EDGE COMPUTING TO RE-POPULATE NONCE VALUES IN CACHED CONTENT

(71) Applicant: CLOUDFLARE, INC., San Francisco, CA (US)

(72) Inventor: Aleksander Amrani, Austin, TX (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 16/375,664

(22) Filed: Apr. 4, 2019

(51) Int. Cl.
*H04L 29/08* (2006.01)
*G06F 21/10* (2013.01)
*H04L 29/12* (2006.01)

(52) U.S. Cl.
CPC .......... *H04L 67/2842* (2013.01); *G06F 21/10* (2013.01); *H04L 61/1511* (2013.01); *H04L 67/02* (2013.01); *H04L 67/1097* (2013.01)

(58) Field of Classification Search
CPC ...... G06F 21/10; H04L 61/1511; H04L 67/02; H04L 67/1097; H04L 67/2842; H04L 63/0869
See application file for complete search history.

(56) References Cited

U.S. PATENT DOCUMENTS

| | | | | |
|---|---|---|---|---|
| 7,240,100 B1* | 7/2007 | Wein | ................ | H04L 67/1008 709/214 |
| 9,021,478 B1* | 4/2015 | Wan | ................ | G06F 9/455 718/1 |
| 10,103,989 B2* | 10/2018 | Wood | ................ | H04L 45/7453 |
| 10,341,431 B2* | 7/2019 | Finlow-Bates | ......... | H04L 63/06 |
| 2009/0210526 A1* | 8/2009 | Howell | ............. | H04L 29/12811 709/224 |
| 2009/0216903 A1* | 8/2009 | Howell | ............. | H04L 29/12132 709/245 |
| 2010/0125916 A1* | 5/2010 | Choi | ................ | G06F 21/10 726/31 |
| 2011/0107083 A1* | 5/2011 | Nomura | ................ | H04N 7/165 713/150 |
| 2012/0124372 A1* | 5/2012 | Dilley | ................ | H04L 67/2819 713/162 |
| 2016/0043960 A1* | 2/2016 | Solis | ................ | H04L 67/10 709/223 |
| 2017/0163616 A1* | 6/2017 | Smith | ................ | H04L 63/061 |
| 2017/0257383 A1* | 9/2017 | Ficarra | ................ | H04L 63/1408 |
| 2017/0257904 A1* | 9/2017 | Mildh | ................ | H04W 68/005 |
| 2018/0013666 A1* | 1/2018 | Wood | ................ | H04L 45/54 |
| 2018/0137062 A1* | 5/2018 | Awad | ................ | G06F 3/0604 |
| 2018/0189528 A1* | 7/2018 | Hanis | ................ | G06Q 30/0185 |

(Continued)

*Primary Examiner* — Jerry B Dennison
(74) *Attorney, Agent, or Firm* — NDWE, LLP

(57) ABSTRACT

A compute server receives, at a first compute server of a plurality of compute servers, a request from a client device, where the plurality of compute servers are part of a distributed cloud computing platform, and wherein the request is a request for a network resource. The compute server executes, by a single process at the first compute server, a nonce generator, wherein the nonce generator is run in a one of a plurality of isolated execution environments, locates at least one content item in response to the request for the network resource, detects a first nonce value in the at least one content item, computes a second nonce value by the nonce generator, and replaces the first nonce value with the second nonce value in the content item.

21 Claims, 8 Drawing Sheets

(56) References Cited

U.S. PATENT DOCUMENTS

| | | | |
|---|---|---|---|
| 2018/0198764 A1* | 7/2018 | Kumar | H04L 63/0428 |
| 2019/0081797 A1* | 3/2019 | Bos | H04L 9/3252 |
| 2019/0103970 A1* | 4/2019 | Koszek | H04L 9/14 |
| 2019/0197130 A1* | 6/2019 | Huang | H04L 9/0637 |

* cited by examiner

```
CONTENT ITEM

<HTML>
<meta http-equiv="Content-Security-Policy" content="default-src 'self'; child-src 'none'; object-src 'none'">

Content-Security-Policy: script-src 'nonce-N1D2W3E4asdfgiBydWxIcyA7KQ'

<script nonce="N1D2W3E4asdfgiBydWxIcyA7KQ">
   var a = 'b';
   a = a + 1
</script>

<script nonce="N1D2W3E4asdfgiBydWxIcyA7KQ">
   b = b +2;
</script>

<script">
   b = 0;
</script>

<script nonce="amG0c3VhcmfIci1ydWxIcG">
   a = 5;
</script>

</HTML>
```

FIG. 3

ISOLATED EXECUTION
ENVRIONMENT MODEL

VIRTUAL MACHINE
MODEL

USING POST-CACHE EDGE COMPUTING TO RE-POPULATE NONCE VALUES IN CACHED CONTENT

FIELD

Embodiments of the invention relate to the field of network computing; and more specifically, to a distributed cloud computing platform that manages the utilization of nonce values in cached content items and responses from origin servers at proxy servers in the distributed cloud computing network.

BACKGROUND

Historically, the use of web application code has been split between origin servers and browsers that are connected to one another by a network that transmits data from point to point. Initially, large websites and web applications were first run on large physical mainframe servers that could handle large traffic loads and large data transfers. Over time a switch was made to provide websites and web applications on tens to hundreds of commodity servers that allowed for a reduction in cost, more fault tolerance, and increased performance. This technology is referred to as cloud computing. The technology for providing web applications further evolved to utilize virtual machines where one physical machine could be split into multiple virtual machines that can be independently managed. Virtual machines typically have a high overhead cost in terms of compute resources. For instance, each virtual machine is typically allocated hundreds of megabytes of random-access memory (RAM) and typically takes tens of seconds to boot. Virtual containers can be used to provide isolation between customers of the cloud computing platform and are less resource intensive than virtual machines. However, web application code running in a container typically is run in its own OS-level process, consuming RAM, and inducing context-switching overhead. While native code can load quickly in a container, many server-oriented language execution environments are not optimized for startup time.

Some cloud computing platforms instantiate a containerized process for customer code and auto-scale the process which creates cold-starts. A cold-start occurs when a new copy of the code starts on a physical machine. When a new containerized process is instantiated it can take between hundreds of milliseconds to multiple seconds (e.g., between 500 ms to 10 seconds) to complete. This means that any request to be serviced by the code to be executed in a container may be waiting for as much time as it takes to start execution of the new containerized process (e.g., for as much as ten seconds). Also, this containerized process can only process a single request at a time and a new containerized process must be cold-started each time an additional concurrent request is received. This means that each such request to be serviced by a new container can experience significant lag that does not improve over time. If the containerized process does not receive a request to be processed within a certain amount of time, it will automatically terminate and a new containerized process will need to be cold-started again once a request is received. When new customer code is deployed, this entire process proceeds again as each containerized process needs to be instantiated anew.

In these complex cloud computing platforms, security can be difficult to maintain. Hackers can attack websites in many different manners. In some cases, hackers seek to find a mechanism to get an origin server to execute injected scripts. One mechanism to prevent such attacks is the use of a nonce value in legitimate scripts in the content items provided by an origin server. The injected scripts do not contain a nonce value that matches a nonce value provided by an origin server and can then be identified and blocked from execution. Since nonce values are generated by an origin server, content items that contain nonce values cannot be cached in other locations to reduce latency, because the nonce value and content item are generated by the origin server and cached copies would not have proper nonce values that can protect the content item.

BRIEF DESCRIPTION OF THE DRAWINGS

The invention may best be understood by referring to the following description and accompanying drawings that are used to illustrate embodiments of the invention. In the drawings:

FIG. 3 is an example web page with a nonce according to one embodiment.

DESCRIPTION OF EMBODIMENTS

Figure 1:
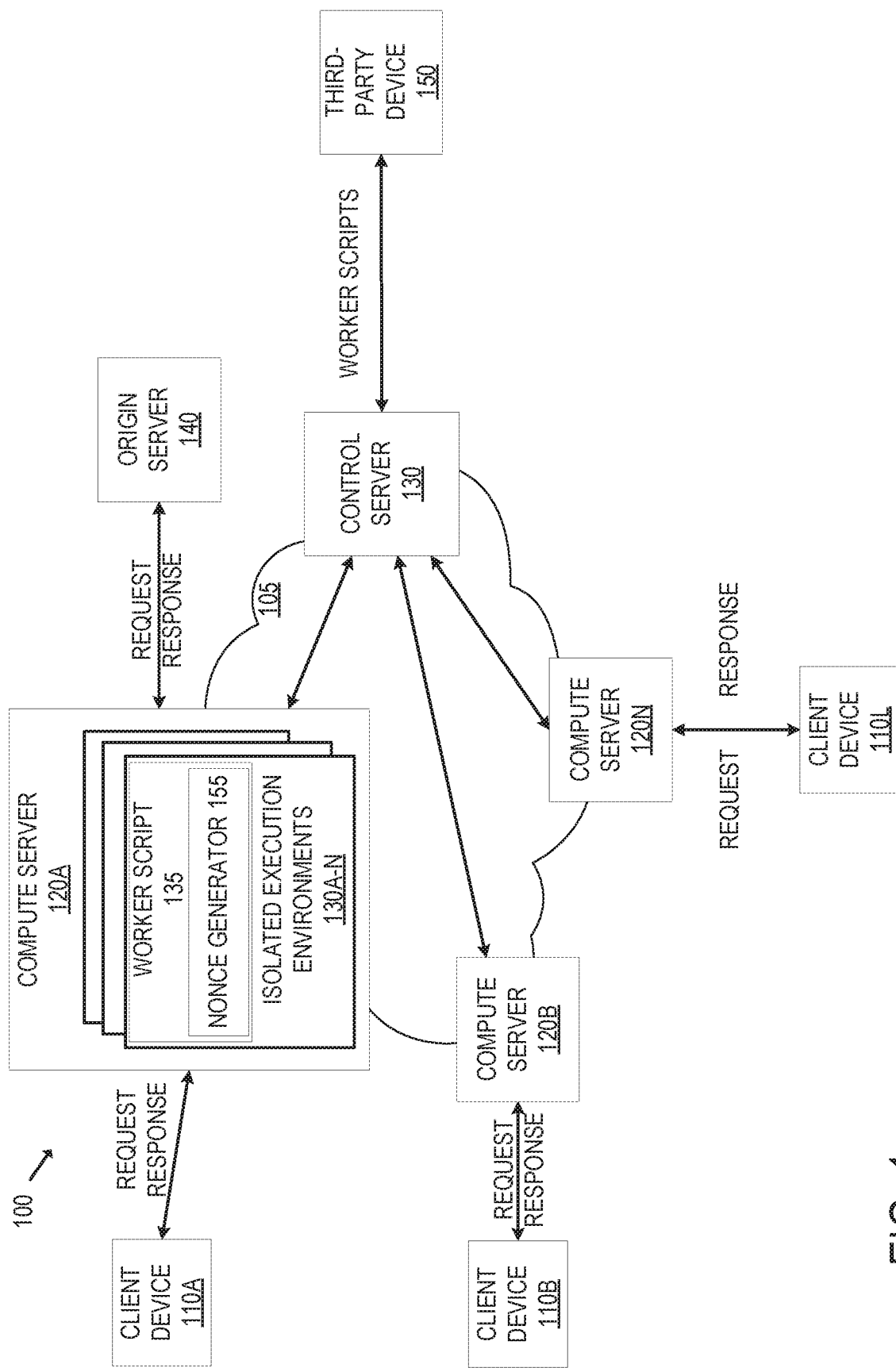
FIG. 1 illustrates an exemplary embodiment of a cloud computing platform that executes a nonce generator in a distributed cloud computing network according to an embodiment.

A method and apparatus that provides a nonce generator in a distributed cloud computing network is described. The distributed cloud computing network includes multiple compute servers that are geographically distributed (e.g., in different locations throughout the world). There may be hundreds of compute servers that are geographically distributed in different points-of-presences (PoPs). Each PoP may include one or more physical servers (e.g., one or more compute servers, one or more control servers, one or more domain name system (DNS) servers (e.g., one or more authoritative name servers, one or more proxy DNS servers), and one or more other pieces of network equipment such as router(s), switch(es), and/or hub(s)). Each PoP may be part of a different data center and/or colocation site. The distributed cloud computing network may provide different services for customers (e.g., domain owners or operators) including nonce generation via a nonce generator that is executed at the compute servers.

The nonce generator is executed as a code at the PoP to inspect the responses being returned to client devices at the PoP. The nonce generator examines the network resources associated with responses including the content items (e.g., web pages, scripts, images and similar content items) that make up these network resources to identify content items that contain nonce values, which the nonce generator then replaces. The nonce values are pseudo-random 'numbers used once.' The nonce values are used in content items like scripts and html code to identify non-malicious or trusted content. Nonce values are utilized in connection with various security features such as content security policies (CSP). The nonce value in a content item is expected to have been generated at an origin server and can occur at multiple locations in the content item. If a hacker has attempted to inject code such as a script into a content item, then the malicious script can be identified because it will not have a matching nonce value since the hacker cannot predict what the matching nonce value will be to utilize in the malicious script. The malicious script can then be blocked from execution.

However, the use of nonce values and the associated technologies like CSP introduce inefficiencies in the distribution of the content items that utilize the nonce values. Since the nonce value is generated by an origin server, local caching of the content item with the nonce value cannot be utilized, because a locally cached copy would have an already utilized nonce value, which could be predicted by a hacker. The embodiments overcome this limitation by providing a nonce generator that is executed local to the cache, where the nonce generator identifies nonce values and updates them with new nonce values such that the content item in the cache can be utilized with a secure nonce value. The nonce generator is executed at a proxy server or similar edge device as deployed code.

Code deployed to the compute server (e.g., code written by or deployed by third-parties such as customers of the cloud computing platform or by first-parties such as the cloud computing platform manager) can be deployed to all or some of the compute servers of the distributed cloud computing network. The code can be, for example, a piece of JavaScript or other dynamically-typed language, a WebAssembly (WASM) compiled piece of code, or other compiled code. In an embodiment, the deployed code is compliant with the W3C standard ServiceWorker application programming interface (API). The deployed code can, for example, intercept and answer hypertext transfer protocol (HTTP) requests and make outgoing HTTP subrequests as part of answering an HTTP request. For purposes of this description, each piece of deployed code is referred to as a worker script and an executed instance of the worker script is referred to as a worker. According to some embodiments, the nonce generator is implemented as a worker script or a function of a worker script.

A worker script of a particular first-party or third-party is run in an execution environment in which a single process can safely run first-party or third-party code. The process can contain multiple execution environments at the same time and the process can seamlessly switch between them. Code in one execution environment cannot interfere with code running in a different execution environment despite being in the same process. The execution environments are managed in user-space rather than by an operating system. Each execution environment uses its own mechanism to ensure safe memory access, such as preventing the code from requesting access to arbitrary memory (restricting its use to the objects it has been given) and/or interpreting pointers within a private address space that is a subset of an overall address space. This execution environment is not a container or virtual machine. For purposes of description, this type of execution environment is sometimes referred herein as an isolated execution environment. In a specific example implementation, the worker script is run in an isolate of the V8 JavaScript engine.

Because a single process can run multiple isolated execution environments, the overhead of running the isolated execution environments is incurred once (e.g., starting the single process to run the isolated execution environments) and isolated execution environments can be started and run with very little individual overhead. The worker scripts are not executed using a virtual machine or a container. Unlike other cloud computing platforms that spin up a containerized process for processing code that can take as much as ten seconds, an isolated execution environment can be started in as little as 5 ms because a new process does not need to be started (assuming the single process that runs the isolated execution environments is started). Also, since the worker scripts can be run in a single process, there are no expensive context switches like those experienced with other cloud computing platforms which means that more time is spent running the code instead of performing context switches. Also, because the implementations of the single process are shared between all isolated execution environments, the memory requirements are less than traditional cloud computing platforms.

In an embodiment, a particular nonce generator is loaded as a part of a worker script and executed on-demand (when and only if it is needed) at a particular compute server of the distributed cloud computing network. Each request for a content item that triggers handling of a response by a nonce generator is handled by the nonce generator at the compute server that is closest to the requesting client device. For instance, when responding to a client device in New Zealand, a nonce generator and worker script is run in a compute server in New Zealand that is closest to the client device. The compute server that receives the request may be determined by the network infrastructure according to an Anycast implementation or by a geographical load balancer.

FIG. 1 illustrates an exemplary embodiment of a cloud computing platform that executes the nonce generator in a distributed cloud computing network according to an embodiment. The cloud computing platform can also provide different services in addition to the nonce generator such as protecting against internet-based threats, providing performance services for customers (e.g., acting as a content delivery network (CDN) and dynamically caching customer's files close to visitors, page acceleration, etc.), TCP stack optimizations, and/or other services. The system 100 includes the client devices 110A-N, the compute servers 120A-N, the control server 130, the origin server 140, and the third-party device 150.

Each client device 110A-N is a computing device (e.g., laptop, workstation, smartphone, mobile phone, tablet, gaming system, set top box, wearable device, Internet of Things (IoT) device, etc.) that is capable of transmitting and/or receiving network traffic. Each client device may execute a client network application such as a web browser, native application, or other application that can access network resources (e.g., web pages, images, word processing documents, PDF files, movie files, music files, or other computer files).

The compute servers 120A-N are part of the cloud computing platform. The compute servers 120A-N are physical servers and are geographically distributed (e.g., in different locations throughout the world). The compute servers 120A-N are part of the distributed cloud computing network 105. There may be hundreds of compute servers as part of the cloud computing platform. Although not illustrated in FIG. 1, the compute servers 120A-N may be part of PoPs that may include other physical servers (e.g., one or more compute servers, one or more control servers, one or more DNS servers (e.g., one or more authoritative name servers, one or more proxy DNS servers), and one or more other pieces of network equipment such as router(s), switch(es), and/or hub(s)). Each PoP (and each compute server) may be part of a different data center and/or colocation site. Although not illustrated in FIG. 1, there are other physical devices in the cloud computing network between the compute servers 120A-N such as routers, switches, and other intermediate computing devices.

The control server 130 is operated by the cloud computing platform and provides a set of tools and interfaces for a customer to, among other things, configure code to run in the cloud computing platform. For instance, the control server 130 may allow the customer to upload one or more worker scripts and may allow the customer to specify when the worker script(s) are to be run. For instance, the customer may configure a nonce generator 155 that identifies content items with nonce values that are updated or replaced before being sent to the client device. By way of example, the control server 130 may allow the customer to configure a specific set of nonce values that the nonce generator will search for in the responses from the origin server. A customer could also be allowed to configure which content items are allowed to have nonce value updates and other aspects The control server 130 may allow the customer to delete and update previously uploaded nonce generator configurations or to modify the configuration of already uploaded nonce generator configurations. The control server can also provide tools to enable the customer to control the actions taken when a nonce value is updated or replaced, such as logging or reporting the update or replacement.

The control server 130 deploys each nonce generator to each of the compute servers 120A-N automatically (without the customer selecting which of the compute servers 120A-N in which to deploy the worker script). In another embodiment, the control server 130 allows the customer to indicate which of the compute servers 120A-N are to be deployed a particular nonce generator or specific nonce generator configurations. The control server 130 creates an identifier for each nonce generator worker script. In an embodiment, the identifier is created by hashing the content of the nonce generator (e.g., using a cryptographic hash function such as SHA-256), where two scripts with identical content will have the same identifier even if uploaded by different customers and even if applied to different zones.

In an embodiment, the control server 130 allows a customer to provision the nonce generators to the cloud computing platform through DNS. For example, DNS record(s) of a customer are changed such that DNS records of hostnames point to an IP address of a compute server instead of the origin server. In some embodiments, the authoritative name server of the customer's domain is changed to an authoritative name server of the service and/or individual DNS records are changed to point to the compute server (or point to other domain(s) that point to a compute server of the service). For example, the customers may change their DNS records to point to a CNAME record that points to a compute server of the service. In one embodiment, customers may use the control server 130 to change their authoritative name server to an authoritative name server of the cloud computing platform and/or change their zone file records to have their domain point to the compute servers. Pointing the DNS or similar records to the compute server 120A enables the compute server to act as a proxy for requests directed to the origin server. In this manner, the requests for content items sent to the origin server and the responses thereto pass through the computer server and enable the nonce generator to examine the responses.

The third-party device 150 is a computing device (e.g., laptop, workstation, smartphone, mobile phone, tablet, etc.) that is used by third-parties to, among other things, configure their nonce generator to run in the cloud computing platform. A third-party may be a customer of the cloud computing platform and/or a party that is configuring nonce generator code to run in the cloud computing platform on behalf of the customer.

The origin server 140, which may be owned or operated directly or indirectly by the customer of the cloud computing platform, is a computing device on which a network resource resides and/or originates (e.g., web pages, images, word processing documents, PDF files movie files, music files, or other content items). In an embodiment, the origin server 140 is not required to be in the cloud computing platform (e.g., nonce generator code may run on the compute servers without communicating with an origin server). Although FIG. 1 illustrates the origin server 140 communicating with the compute server 120A, the origin server 140 may also communicate with one or more of the other compute servers 120B-N. Similarly, while FIG. 1 illustrates a case with a single origin server, the cloud computing platform can service any number of origin servers each with separate nonce generators distributed to the compute servers.

The compute servers 120A-N are geographically distributed which decreases the distance between requesting client devices and the compute servers and decreases the time necessary to respond to a request. The compute servers 120A-N may operate as a reverse proxy and receive requests for network resources (e.g., HTTP requests) of a domain of the origin server 140. The particular compute server 120 that receives a request from a client device may be determined by the network infrastructure according to an anycast implementation or by a geographical load balancer. For instance, the compute servers 120A-N may have a same anycast Internet Protocol (IP) address for a domain of the origin server 140. If the origin server 140 handles the domain "example.com," a domain name service (DNS) request for "example.com" returns an address record having the anycast IP address of the compute servers 120A-N. Which one of the compute servers 120A-N receives a request from a client device depends on which compute server 120 is closest to the client device in terms of routing protocol configuration (e.g., Border Gateway Protocol (BGP) configuration) according to an anycast implementation as determined by the network infrastructure (e.g., router(s), switch(es), and/or other network equipment between the requesting client and the compute servers 120A-N. By way of example, the client device 110A is closest to the compute server 120A, the client device 110B is closest to the compute server 120B, and the client device 110L is closest to the compute server 120N. Accordingly, requests from the client device 110A are received at the compute server 120A, requests from the client device 110B are received at the compute server 120B, and requests from the client device 110L are received at the compute server 120N. In some embodiments, instead of using an anycast mechanism, a geographical load balancer is used to route traffic to the nearest compute server. The number of client devices and compute servers illustrated in FIG. 1 is exemplary. The distributed cloud computing network 105 may include hundreds to thousands (or more) compute servers and each compute server may receive requests from thousands or more client devices.

In the example of FIG. 1, each of the compute servers 120A-N can execute the worker script(s) of a third-party such as the nonce generators of customers. Each worker script is run in an isolated execution environment, such as running in an isolate of the V8 JavaScript engine. Thus, as illustrated in FIG. 1, the compute server 120A includes the isolated execution environments 130A-N that each executes a separate worker script 135. The isolated execution environment 130A-N are run within a single process. The worker scripts are not executed using a virtual machine or a container. In an embodiment, a particular worker script, e.g., a worker script implementing a nonce generator, is loaded and executed on-demand (when and only if it is needed) at a particular compute server of the distributed cloud computing network. Each request for a domain can trigger handling by a nonce generator and other worker scripts that will handle the request and response at the compute server that is closest to the requesting user.

The nonce generator 155 is a worker script or worker that is executed on behalf of a customer at compute server to identify content items that have been improperly accessed and thereby detect data breaches. The operation of the nonce generator is discussed herein below in further detail with reference to FIGS. 3 and 4A-4C. The nonce generator searches content items cached locally at a compute server or in proximity to the compute server. In some embodiments, the nonce generator also searches content items returned by an origin server as a response to a request for a network resource from a client device. When the nonce generator identifies a content item with a nonce value, then the nonce generator can update or replace the nonce value with a unique nonce value. In some embodiments, the updates to the nonce value can be logged and in some cases cause a notification to be sent to the customer. The log can be maintained locally or at the control server and notifications can similarly be generated in response to log entry generation at the control server. In other embodiments, the log can be stored in any location accessible to the nonce generator in the cloud computing platform. Notifications can be sent by each nonce generator to the customer or can be aggregated at the control server or similar location.

Figure 2:
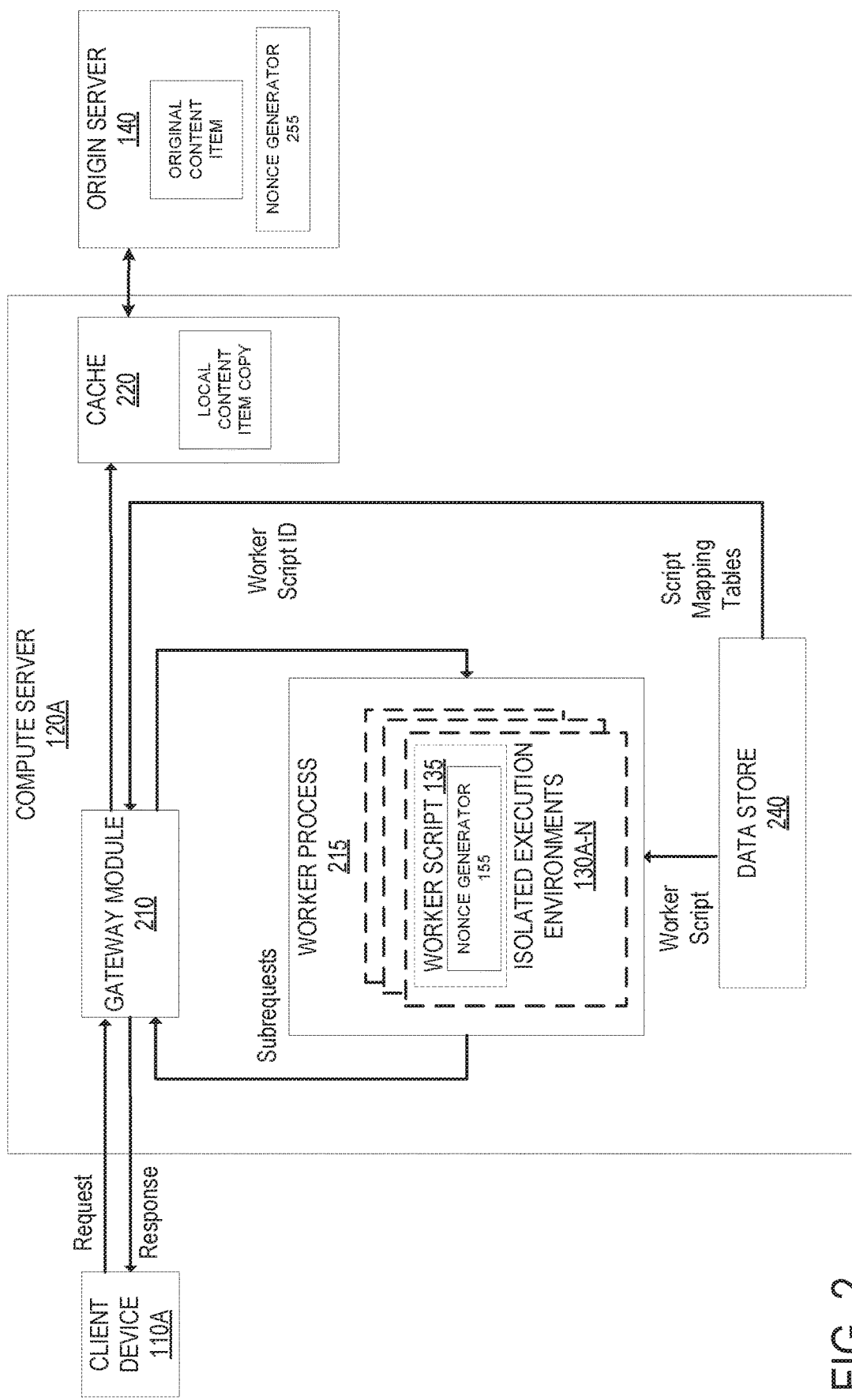
FIG. 2 illustrates an example of a compute server that executes a nonce generator according to one embodiment.

FIG. 2 illustrates an example of a compute server 120 according to an embodiment. The compute server 120A includes a gateway module 210, a worker process 215, a cache 220, and a data store 240. The gateway module 210 receives web requests and processes web responses (e.g., HTTP requests and HTTP responses). The gateway module 210 may be acting as a reverse proxy for the origin server 140. The gateway module 210 has access to the cache 220 that is configured to cache network resources (e.g., web pages, images, word processing documents, PDF files movie files, music files, or similar computer files), configuration files, scripts, and/or other content items. The local content items in the cache 220 are copies of identical content items provided by the origin server. The local content items can have nonce values that are generated by a nonce generator 255 at the origin server. On the first request for the content item the nonce value generated by the origin server is valid. However, subsequently, the nonce value in the local content item cannot be re-used and must be replaced. The data store 240 is configured to store, among other items, the worker scripts such as the nonce generator that are received from the control server 130.

Each worker process 215 is a single process that executes the isolated execution environments 130A-N. There may be hundreds to thousands of isolated execution environments that are run simultaneously by the worker process 215. Each different worker script 135, such as the nonce generator 155, is run by a different one of the isolated execution environments 130A-N each with its own heap or similar memory structure. The worker process 215 starts an isolated execution environment to load a particular worker script on the first use of the worker script. Depending on the complexity of the worker script, loading the worker script may take approximately tens to hundreds of milliseconds of processor time. A worker script stays loaded in memory between requests so that the worker script can be used to respond quickly when a new request that triggers that worker script arrives. Handling a single request for a worker script that is already loaded typically takes a fraction of a millisecond of processor time depending on the complexity of the worker script. In an embodiment, one isolated execution environment is created per unique worker script identifier. Thus, if many zones use identical worker scripts, memory is saved by compiling the script only once. The worker process 215 evicts worker scripts (e.g., in a least recently used fashion). The worker process 215 may be started during the booting of the compute server 120A or when the first worker script is triggered for execution.

The gateway module 210 receives a request from the client device 110A. The request may be an HTTP request for a zone of the customer. A zone is a subset of a set of resources of the distributed computing platform. The gateway module 210 processes the request including determining whether the request triggers executing of a worker script such as the nonce generator. For instance, the gateway module 210 analyzes a uniform resource locator (URL) in the request against the URL matching pattern configured for the zone to determine if a worker script such as the nonce generator is to be executed. If a worker script is to be executed, the gateway module 210 annotates the request with the identifier of the worker script to be executed as determined by a script mapping table and forwards the request to the worker process 215. If the identified worker script is already loaded (if there is already an isolated execution environment running an instance of the worker script), the worker process 215 does not need to load another instance of the worker script. However, if the identified worker script that is already loaded is from a different zone (which is probably from a different customer), the worker process 215 creates a separate context (a global object) for the worker script so that each zone has its own isolated global state. That prevents zones from interfering with the state of other zones. The gateway module 210 generates the response after the worker script(s) are executed. If the identified worker script is not loaded, the worker process 215 creates an isolated execution environment and loads and executes the worker script.

The executed worker script can take various actions depending on how the script is written. The worker script may make one or more further requests (referred herein as "subrequests") such as additional HTTP requests. These subrequests may be destined for the origin server 140 or to other destinations on the internet. The worker process 215 sends the subrequests back to the gateway module 210 for further processing. The gateway module 210 is configured to prevent the subrequest from looping back to the same worker script. But, the subrequest may trigger a different worker script potentially from a different zone. If the subrequest is to the same zone, the gateway module 210 transmits the subrequest to the origin server 140 for processing and receives the response from the origin server 140. If the subrequest triggers a worker script, the gateway module 210 annotates the request with the identifier of the worker script to be executed as determined by the script mapping table and forwards the request to the worker process 215 for executing the script.

Thus, a single request can trigger multiple worker scripts, even from different zones from different customers, to be run. Since the worker scripts are run on the same physical compute server, network latency to execute these scripts reduces to zero. Further, there is savings in bandwidth because the different origin zones may not need to be contacted. In the embodiments where a nonce generator is among the triggered worker scripts, an example scenario is a customer that has a service to provide a complex website with images, forms, scripts, and similar content items. The user of a client device sends an HTTP request for a webpage. The gateway module 210 instantiates worker scripts to retrieve the web pages as well as the related content items. The nonce generator is also instantiated. The gateway module checks the local content cache 220 for local copies of the requested content items. Any content item that is not found in the cache 220 causes the gateway module to request those content items from the origin server. The origin server responds to the requests from the gateway module and sub-requests for specific content items. The nonce generator searches each of the content items found in the local cache to identify nonce values. In some embodiments, the nonce generate can also search content items returned from the origin server. If a nonce value is identified, then the nonce generator can generate a replacement nonce value using an random or pseudo-random number generation algorithm or process. The generated nonce value is written into the content item in place of the existing nonce value found therein. The same generated nonce value is used to replace all nonce values in the content item. In some embodiments, the nonce generator can record the information related to the replacement of the existing nonce value in a log in the data store or in a similar location. The nonce generator can subsequently send updates to the to the control server and notifications of changes to the nonce values to the customer.

FIG. 3 is a diagram of an example web page with a nonce value. In this example, a basic webpage is shown that utilizes a nonce value. In this example, the nonce value is utilized in conjunction with CSP. A CSP is defined in the <meta> tag. The content item can include scripts, text and similar content. In this example, the CSP indicates that the scripts have a specific nonce value (e.g., 'nonce-N1D2W3E4asdfgiBydWxlcyA7KQ). Thus, all legitimate scripts will contain the same nonce value. The nonce value can be selected by the nonce generator at the origin server or at the proxy server and can only be utilized once (i.e., there is a one to one relationship between responses and nonce values). In this example, the first two scripts include the proper nonce value and can be executed at the client device. However, the subsequent scripts do not include the nonce value and should not be executed. This can occur due to errors in coding or by injection of malicious code into the content item.

A content item that is protected with the CSP should not execute the two subsequent scripts with missing or incorrect nonce values. A client device can ignore these scripts and can report or log their presences. The nonce generator at a proxy server can search a content item to find the nonce values when there is a subsequent request for the same content item and it is stored in the local cache. In this example, only the valid nonce values that match the header nonce value would be updated and replaced. In other embodiments, the nonce generator can identify non-matching, missing or improper nonce value information and log or report such content items to bring them to the customer's attention. In some embodiments, the nonce generator will not act to interrupt the retrieval of a content item with improper or missing nonce values and functions solely for detection and replacement of valid nonce values. This configuration can be utilized to prevent errors in coding from blocking a legitimate access of data. In other embodiments, the nonce generator can block a response from being sent to a requestor where the improper or missing nonce values are found.

Figure 4A:
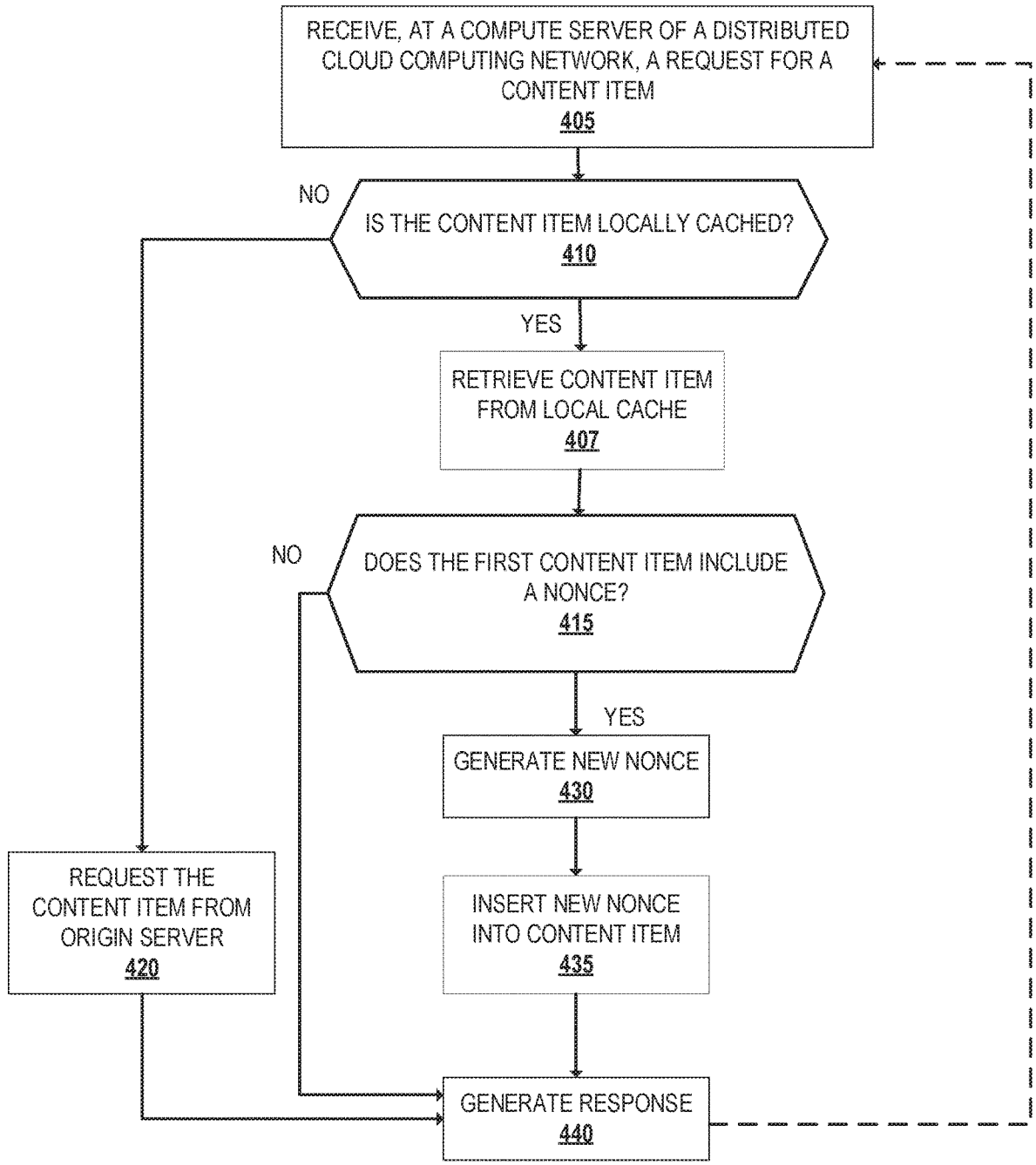
FIGS. 4A-4C are flow diagrams that illustrate exemplary operations for executing a nonce generator in a distributed cloud computing network according to an embodiment.
Figure 4B:
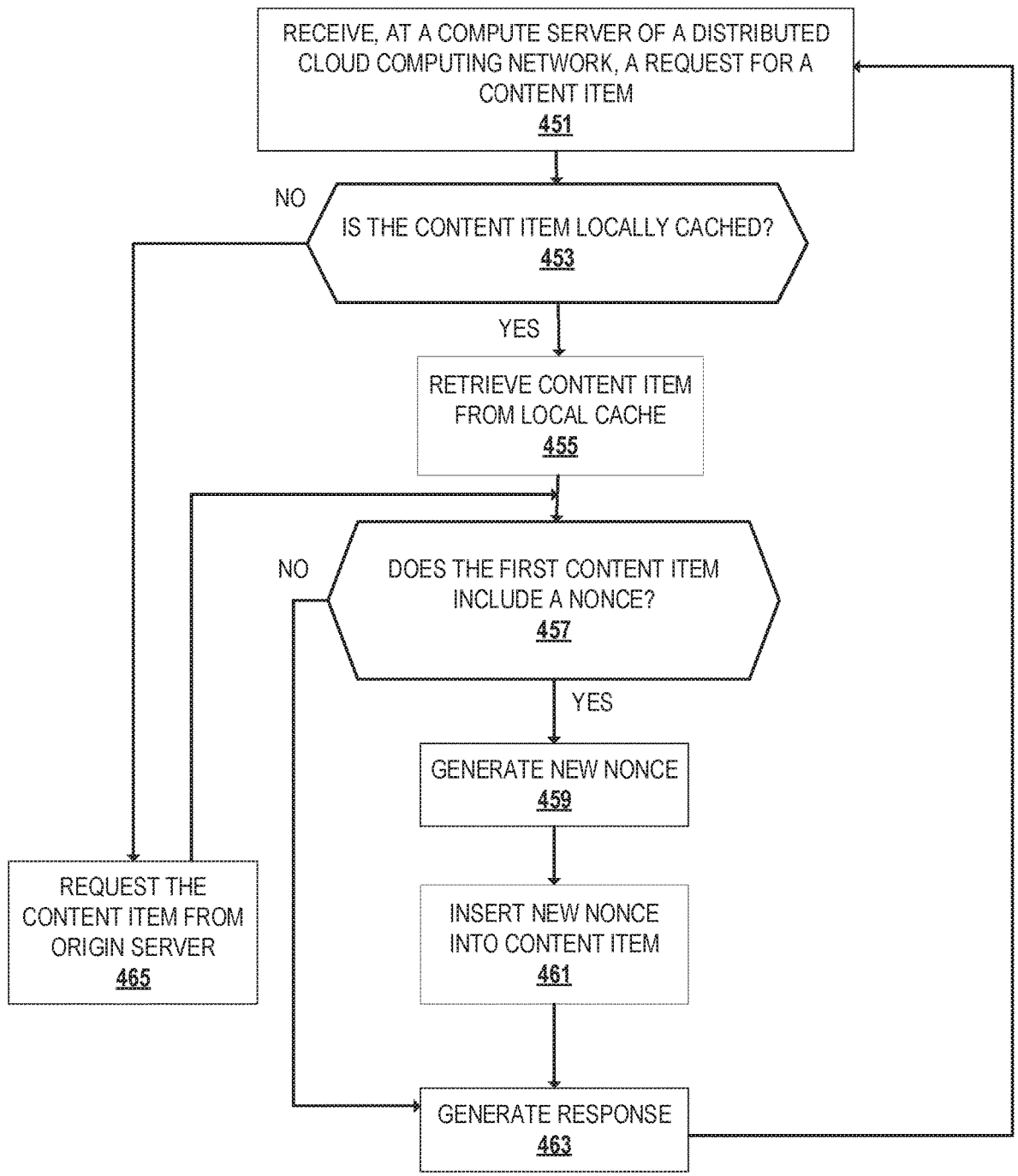
Figure 4C:
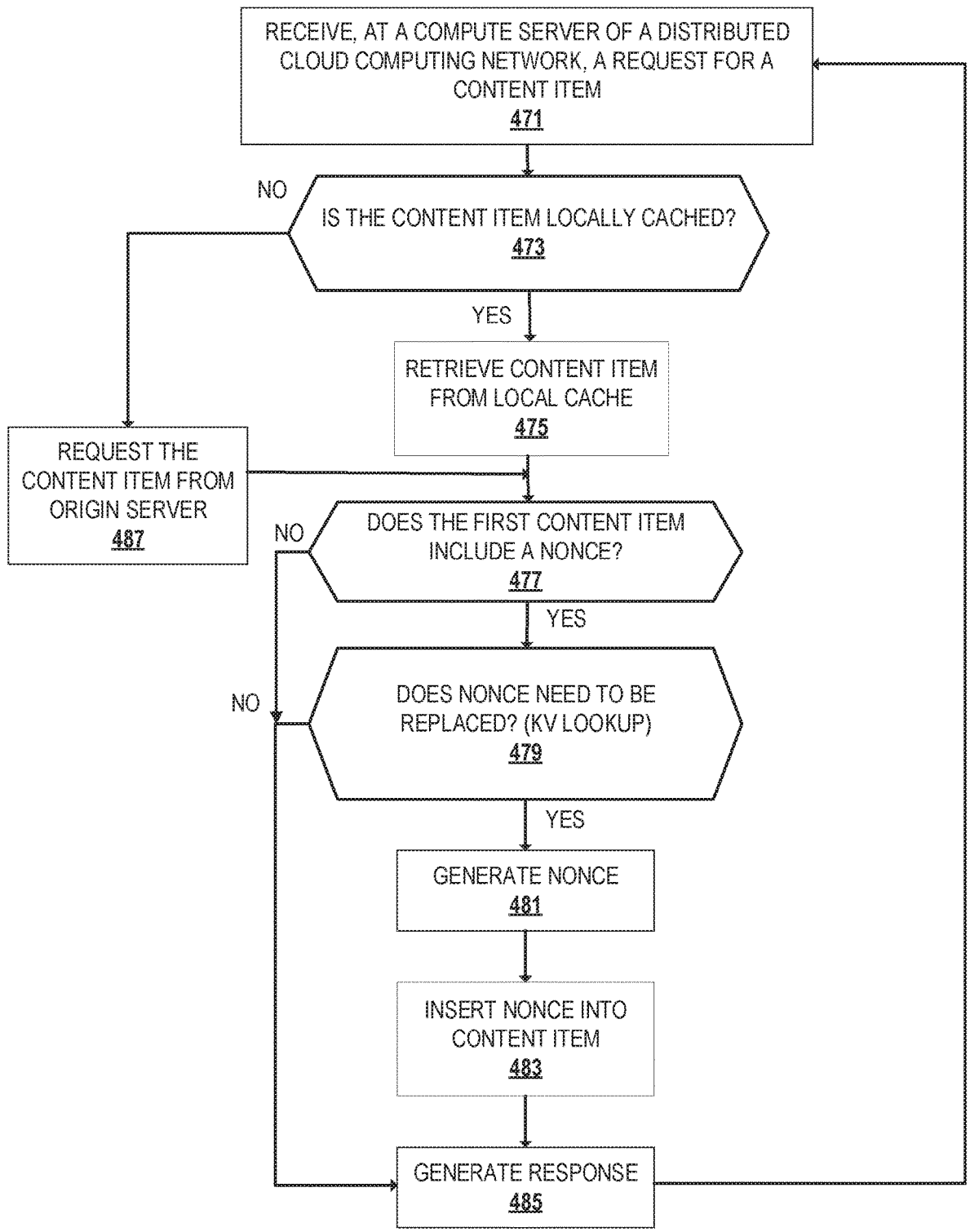

FIGS. 4A-4C are flow diagrams that illustrates exemplary operations for executing a nonce generator in a distributed cloud computing network according to an embodiment. The operations of FIGS. 4A-C are described with respect to the exemplary embodiment of FIGS. 1 and 2. However, the operations of FIGS. 4A-4C can be performed by different embodiments than those of FIG. 1 and, and the embodiment described in FIGS. 1 and 2 can perform operations different than those of FIGS. 4A-4C. The operations of FIGS. 4A-4C will be described with respect to HTTP/S requests and responses. But, the operations of FIGS. 4A-4C can be performed with different types of network resource requests and responses. FIGS. 4A-4C illustrate alternate example operations for the functioning of the nonce generator. These example operations are provided by way of illustration and not limitation. One skilled in the art would appreciate that other alternate embodiments consistent with the principles and features of these examples are within the scope of the embodiments.

In FIG. 4A, at operation 405, a first one of multiple compute servers of a distributed cloud computing network receives a request that triggers execution of a nonce generator. The request may be received from a client device and be an HTTP or HTTPS request, for example, destined for a zone associated with a customer that has configured a nonce generator. The nonce generator is one of multiple worker scripts that can be executed by the first compute server in response to the request. The nonce generator may be a first-party or third-party code piece (written and/or provided by an owner or operator of the zone). The nonce generator can be, for example, a piece of JavaScript or other dynamically-typed language, a WASM compiled piece of code, or other compiled code. The first compute server may determine that the request triggers execution of the nonce generator by matching the zone to a predetermined matching pattern that associates the nonce generator to the predetermined matching pattern. For instance, the compute server may analyze a URL identified in a received HTTP request against a URL matching pattern configured for the zone to determine if a working script is to be executed and if so, which working script, e.g., the nonce generator. With respect to FIG. 1, the compute server 120A receives a request from the client device 120A that triggers execution of a working script such as the nonce generator. In one example, the HTTP request is an HTTP GET method for "example.com," which matches a predefined matching pattern to apply to a nonce generator that searches for protected content markers specific to example.com domain.

The distributed cloud computing network includes multiple compute servers including the first compute server. The compute servers are geographically distributed. There may be hundreds or more compute servers. In an embodiment, each of the compute servers are anycasted to a same IP address, and the first compute server receives the request in operation 405 because the first compute server is the closest one of the compute servers to the client device making the request as determined by an anycast implementation. For instance, a DNS request for an address record of the zone "example.com" returns an anycasted IP address of the compute servers. Alternatively, the first compute server may receive the request as a result of a geographical load balancer routing the request to it.

In an embodiment, each of the compute servers of the distributed cloud computing network includes the working scripts such as the nonce generator. The nonce generator code can be deployed to each of the compute servers without the owner or operator of the zone selecting which of the compute servers are to receive and potentially run the nonce generators. In an alternative embodiment, the owner or operator of the zone selects which of the compute servers are to receive and potentially run the nonce generators.

Next, at operation 410, a single process of the first compute server determines whether network resources requested are locally cached or cached in the set of compute servers. If the requested network resources are not locally cached, then at operation 420, the content item is requested from the origin server and then at operation 440 is returned to the requesting client device. In cases where the requested network resources are locally cached, the nonce generator is invoked and retrieves the content item from the local cache at operation 407. Since the availability in the local cache indicates a prior access of the content item any nonce values therein are not valid for the subsequent access. The gateway module causes the execution of the nonce generator in a first isolated execution environment. Multiple other working scripts can also be started by the gateway module and executed by the single process in multiple other isolated execution environments respectively. Code of a working script in one isolated execution environment cannot interfere with code running in a different execution environment despite being in the same process. The nonce generator code can be triggered to execute for different zones and different customers. The isolated execution environment is managed in user-space rather than by an operating system. Data cannot be shared or moved across isolated execution environments (each isolated execution environment has a completely separate state). The single process on the compute server can run multiple isolated execution environments (e.g., hundreds to thousands) seamlessly switching between them. Each isolated execution environment uses its own mechanism to ensure safe memory access, such as preventing the code from requesting access to arbitrary memory (restricting its use to the objects it has been given) and/or interpreting pointers within a private address space that is a subset of an overall address space. In a specific implementation, the working scripts such as the nonce generator code is run in an isolate of the V8 JavaScript engine.

In an embodiment, the nonce generator code is loaded and executed on-demand (when and only if it is triggered to execute). That is, the nonce generator code will not be loaded into memory until and unless a request triggers it for execution. The nonce generator code stays loaded in memory (at least for a certain amount of time) between requests so that the nonce generator code can be used to respond quickly if a new request is received that triggers execution of that same nonce generator. An eviction process may evict working scripts such as the nonce generator in a least recently used fashion. If the nonce generator is not already loaded in memory and/or an isolated execution environment is not running in which to execute the nonce generator, an isolated execution environment is created, and/or the nonce generator is loaded to memory. Loading the nonce generator code may take approximately tens to hundreds of milliseconds of processor time.

At operation 407, the execution of the nonce generator and other working scripts that are processing a request may cause a set of sub-requests to be generated to retrieve each of the content items that are a part of a requested network resource. A subrequest is an additional request such as an additional HTTP request. The subrequest can be destined for the origin server of the zone or can be destined to a different server on the internet. If the subrequest is for the zone, the first compute server is configured to prevent the subrequest from looping back to the same first piece of code. Instead, the first compute server transmits the subrequest to the origin server for processing. Each sub-request will cause a separate response to be sent to the compute server. For example, where a web page is identified in an initial HTTP GET request, a set of sub-requests to retrieve additional content items such as images and scripts that are associated with the requested web page can be generated.

If the subrequest is for a different zone than that handled by the first compute server (e.g., a DNS request for an address record of the different zone returns an anycasted IP address of the compute servers), the subrequest can be processed by the first compute server directly (without the subrequest being transmitted to another compute server, for example). Processing of this subrequest may trigger a different working script, e.g., a separate nonce generator, to be executed. If the subrequest is for a different zone that is not handled by the first compute server (e.g., a DNS request for an address record of the different zone does not return an IP address of the first compute server), the compute server transmits the subrequest to that different server. In an embodiment, a nonce generator can be limited to handling a predefined number of subrequests. A header stores a number that counts the number of subrequests and if it exceeds the limit, the subrequest will not be processed. Additional sub-requests can be handled by initiating another nonce generator.

Next, at operation 415, the nonce generator searches the content item retrieved from the local cache. The content items can be any type of file including text, HTML, script, video, image, audio file, or similar types of content items. As each of the local content items is retrieved the nonce generator analyzes or searches the content item to identify any nonce values that are embedded therein. If no nonce values are found, then the process completes by the generation and sending of a response with the requested content items of a requested network resource including the locally cached content items at operation 440. The process can then continue to await the retrieval of the next request for a network resource and associated content items. In other embodiments, the nonce generator completes its process and is restarted when another request is received.

If any locally cached content items are found to include a nonce value, then the process generates a new nonce value at operation 430 using any random or pseudo-random nonce value generation process. The nonce value can have any size or range of values including both numeric and non-numeric values. In some embodiments, information about the existing and replacement nonce value can be logged. Similarly, any improper or missing nonce value information can be logged. The logged information can include any information about the request and the content items that included the improper or missing nonce value. This information can be logged locally in a log and/or can be reported to a centralized or remote logging system at the control system or similar location. In some embodiments, the recording of the improper nonce value or missing nonce information triggers a notification to a customer associated with the origin server from which the content item was initially retrieved. In other embodiments, a separate notification is not sent and the customer can inspect the logs to review the logged information. In some embodiments, the process can generate a replacement response to take the place of a response with scripts or similar content items with improper nonce information removed. The replacement response can be an error message or can return alternate content to mask the detection of the improper nonce values.

After a new nonce value is generated, the new nonce value is inserted in place of the old or existing nonce value in the content item at each location where it occurs in the content item at operation 435. The content item with the updated nonce values can then be sent to the client device in a response generated for the client device request at operation 440. The process of the nonce generation can be triggered again at any time by further requests at operation 405 either in a polling mechanism or a triggering mechanism.

Running deployed code such as a nonce generator in isolated execution environments improves the performance as compared with running code using a virtual machine or a container. Unlike other computing platforms that instantiate a containerized process for processing code that can take as much as ten seconds, an isolated execution environment can be started in as little as 5 ms because a new process does not need to be started. Thus, the overhead of running an isolated execution environment is small as compared to other computing platforms. Further, since the third-party code can be run in a single process, there are no expensive context switches like experienced with other computing platforms which means that more time is spent actually running the code instead of performing context switches.

In FIG. 4B an alternate embodiment is shown where content items from the origin server are also searched for nonce values. This process is started at operation 451 where a first one of multiple compute servers of a distributed cloud computing network receives a request that triggers execution of a nonce generator. The nonce generator operates at the compute server in the same manner as described above in reference to FIG. 4A.

Next, at operation 453, a single process of the first compute server determines whether network resources requested are locally cached or cached in the set of compute servers. If the requested network resources are not locally cached, then at operation 465, the content item is requested from the origin server and then at operation 457 a check is made whether content items returned by the origin server include nonce values. If content items are present in the local cache, then at operation 455, the process retrieves the content item from the local cache. Since the availability in the local cache indicates a prior access of the content item any nonce values therein are not valid for the subsequent access.

The gateway module causes the execution of the nonce generator in a first isolated execution environment regardless of whether the content items are cached locally or are retrieved from the content server. As with the other embodiments, multiple other working scripts can also be started by the gateway module and executed by the single process in multiple other isolated execution environments respectively.

Next, at operation 457, the nonce generator searches the content item retrieved from the local cache or returned by the origin server. As each of the content items is retrieved or returned the nonce generator analyzes or searches the content item to identify any nonce values that are embedded therein. If no nonce values are found, then the process completes by the generation and sending of a response with the requested content items of a requested network resource including the locally cached content items or content items retrieved at the origin server at operation 463. The process can then continue to await the retrieval of the next request for a network resource and associated content items. In other embodiments, the nonce generator completes its process and is restarted when another request is received.

If any content items are found to include a nonce value, then the process generates a new nonce value at operation 459 using any random or pseudo-random nonce value generation process. The nonce value can have any size or range of values including both numeric and non-numeric values. In some embodiments, information about the existing and replacement nonce value can be logged. Similarly, any improper or missing nonce value information can be logged.

After a new nonce value is generated, the new nonce value is inserted in place of the old or existing nonce value in the content item at each location where it occurs in the content item at operation 461. The content item with the updated nonce values can then be sent to the client device in a response generated for the client device request at operation 463. The process of the nonce generation can be triggered again at any time by further requests at operation 405 either in a polling mechanism or a triggering mechanism.

In some embodiments, the content items returned by the origin server have placeholder or invalid nonce values allowing the origin server to offload the work of generating the nonce value to the proxy compute server. In other embodiments, the nonce generator at the proxy compute server generates and replaces the nonce value in the content items returned by origin servers even if the content items include a valid nonce value.

In FIG. 4C an alternate embodiment is shown where content items from the origin server are also searched for nonce values and where configuration determines whether nonce values need to be replaced. This process is started at operation 471 where a first one of multiple compute servers of a distributed cloud computing network receives a request that triggers execution of a nonce generator. The nonce generator operates at the compute server in the same manner as described above in reference to FIG. 4A.

Next, at operation 473, a single process of the first compute server determines whether network resources requested are locally cached or cached in the set of compute servers. If the requested network resources are not locally cached, then at operation 487, the content item is requested from the origin server and then at operation 477 a check is made whether content items returned by the origin server include nonce values. If content items are present in the local cache, then at operation 475, the process retrieves the content item from the local cache. Since the availability in the local cache indicates a prior access of the content item any nonce values therein are not valid for the subsequent access.

The gateway module causes the execution of the nonce generator in a first isolated execution environment regardless of whether the content items are cached locally or are retrieved from the content server. As with the other embodiments, multiple other working scripts can also be started by the gateway module and executed by the single process in multiple other isolated execution environments respectively.

Next, at operation 477, the nonce generator searches the content item retrieved from the local cache or returned by the origin server. As each of the content items is retrieved or returned the nonce generator analyzes or searches the content item to identify any nonce values that are embedded therein. If no nonce values are found, then the process completes by the generation and sending of a response with the requested content items of a requested network resource including the locally cached content items or content items retrieved at the origin server at operation 485. The process can then continue to await the retrieval of the next request for a network resource and associated content items. In other embodiments, the nonce generator completes its process and is restarted when another request is received.

If any content items are found to include a nonce value, then the process determines whether the nonce values are to be updated or replaced at operation 479. The update process can look up in a local database or key value storage whether a nonce value is to be replaced at operation 479. A customer can configure nonce values to be replaced based on the identity of the content item, type of the content item, location within the content item or similar characteristics of the content item or the nonce value. If the nonce values are not to be replaced, then the process sends the content items in a response to the client device at operation 485. If the nonce value is to be replaced, then the process generates a new nonce value at operation 481 using any random or pseudo-random nonce value generation process. The nonce value can have any size or range of values including both numeric and non-numeric values. In some embodiments, information about the existing and replacement nonce value can be logged. Similarly, any improper or missing nonce value information can be logged.

After a new nonce value is generated, the new nonce value is inserted in place of the old or existing nonce value in the content item at each location where it occurs in the content item at operation 483. The content item with the updated nonce values can then be sent to the client device in a response generated for the client device request at operation 485. The process of the nonce generation can be triggered again at any time by further requests at operation 471 either in a polling mechanism or a triggering mechanism.

In some embodiments, the content items returned by the origin server have placeholder or invalid nonce values allowing the origin server to offload the work of generating the nonce value to the proxy compute server. In other embodiments, the nonce generator at the proxy compute server generates and replaces the nonce value in the content items returned by origin servers even if the content items include a valid nonce value.

Figure 5:
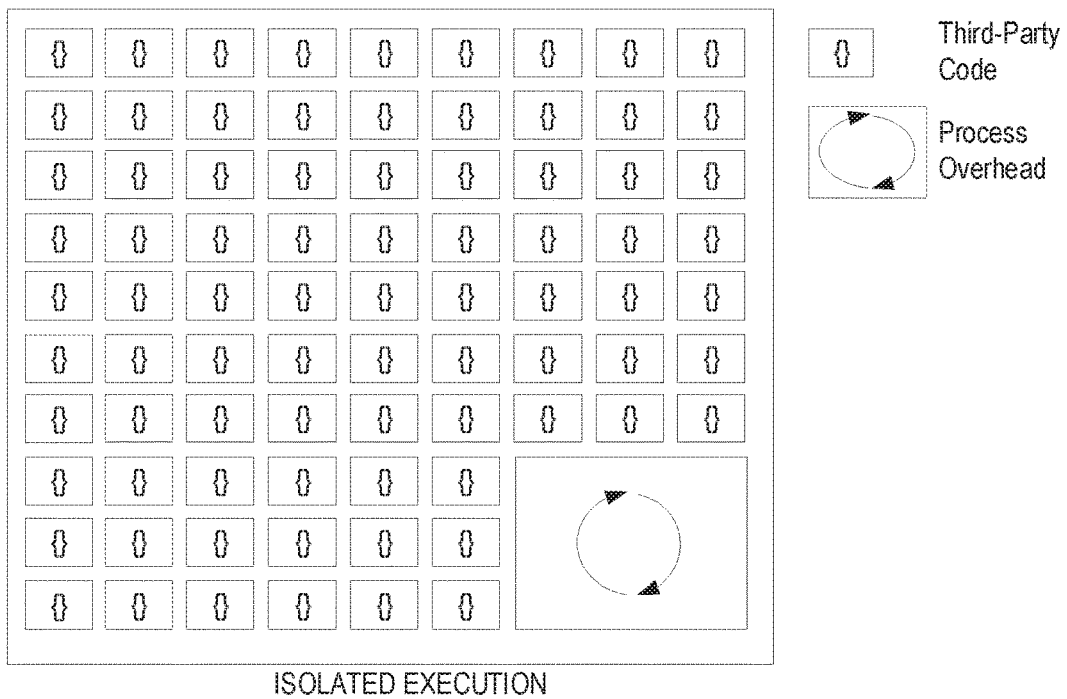
FIG. 5 is a conceptual figure that shows a conceptual relationship between deployed code and the process overhead of the isolated execution environment model that is described in the embodiments.

FIG. 5 is a conceptual figure that shows a conceptual relationship between deployed code and the process overhead of the isolated execution environment model that is described in embodiments herein. As shown, the isolated execution environment can include any number of deployed codes being managed as a set with a single process overhead. The deployed codes can be worker scripts such as the nonce generator or similar code.

Figure 6:
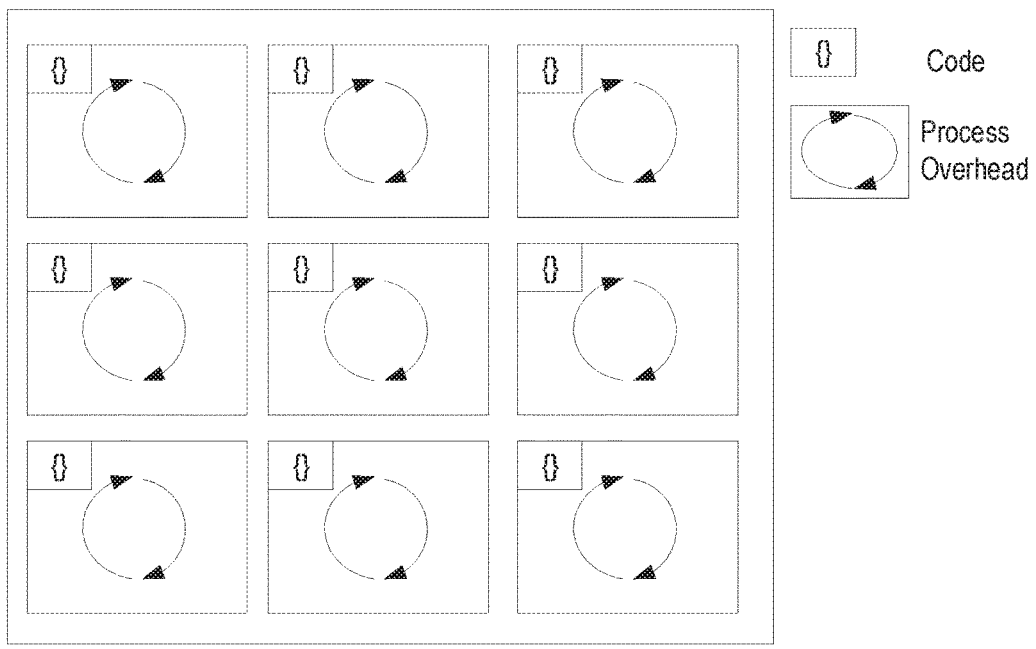
FIG. 6 is a conceptual figure that shows a conceptual relationship between code and the process overhead of a virtual machine model.

FIG. 6 is a conceptual figure that shows a conceptual relationship between code and the process overhead of a virtual machine model by way of comparison. As seen in FIGS. 5 and 6, the process overhead of the virtual machine model is experienced for each different code executed (a new process has to be started for each different code piece), whereas the process overhead of the isolated execution environment model is experienced once.

Figure 7:
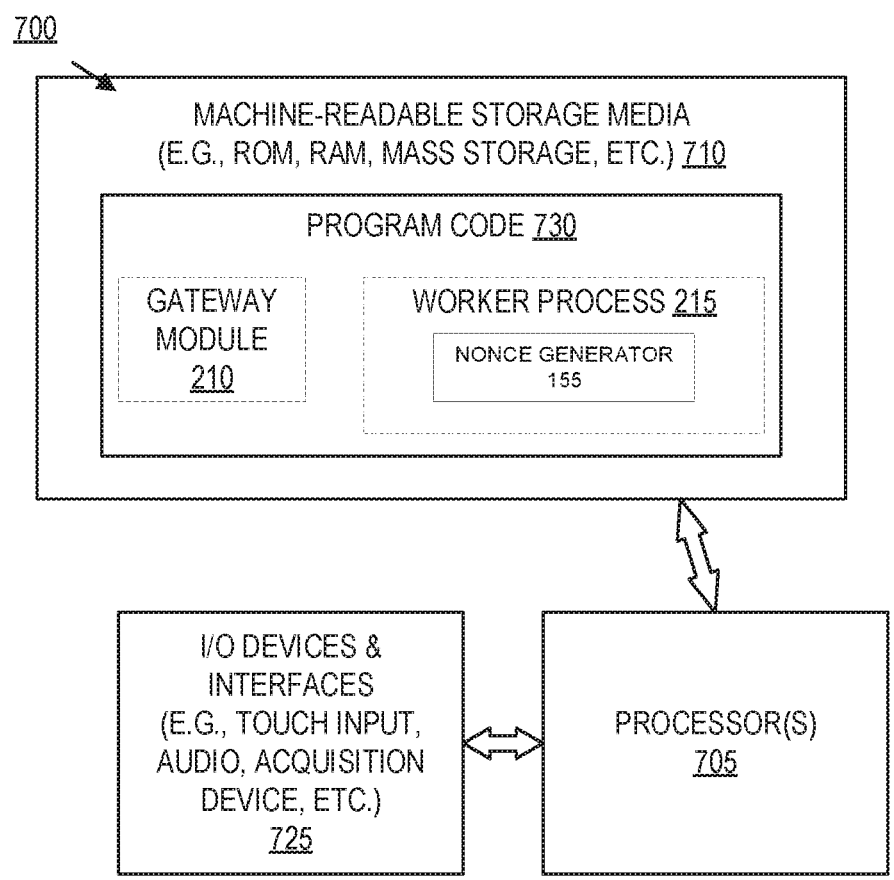
FIG. 7 illustrates a block diagram for an exemplary data processing system that may be used in some embodiments.

FIG. 7 illustrates a block diagram for an exemplary data processing system 700 that may be used in some embodiments. Data processing system 700 includes one or more processors 705 and connected system components (e.g., multiple connected chips). One or more such data processing systems 700 may be utilized to implement the embodiments and operations described with respect to the compute server, control server, or other electronic device.

The data processing system 700 is an electronic device which stores and transmits (internally and/or with other electronic devices over a network) code (which is composed of software instructions and which is sometimes referred to as computer program code or a computer program) and/or data using machine-readable media (also called computer-readable media), such as machine-readable storage media 710 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 705. For example, the depicted machine-readable storage media 710 may store program code 730 that, when executed by the processor(s) 705, causes the data processing system 700 to execute the gateway module 210 and/or the worker process(es) 215 including nonce generators 155 as described herein.

The data processing system 700 also includes one or more input or output ("I/O") devices and interfaces 725, which are provided to allow a user to provide input to, receive output from, and otherwise transfer data to and from the system. These I/O devices 725 may include a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. The I/O devices and interfaces 725 may include wireless transceivers, such as an IEEE 802.11 transceiver, an infrared transceiver, a Bluetooth transceiver, a wireless cellular telephony transceiver (e.g., 2G, 3G, 4G, 5G), an NFC transceiver, or another wireless protocol to connect the data processing system 700 with another device, external component, or a network and receive stored instructions, data, tokens, etc. For instance, a wired or wireless transceiver may transmit and receive messages to and from the compute server as described herein.

Additional components, not shown, may also be part of the system 700, and, in certain embodiments, fewer components than that shown in FIG. 7 may also be used in a data processing system 700. One or more buses may be used to interconnect the various components shown in FIG. 7.

Thus, an electronic device (e.g., a computer or a mobile client device) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The techniques shown in the figures can be implemented using code and data stored and executed on one or more computing devices (e.g., client device, compute server, DNS server, control server, origin server, etc.). Such computing devices store and communicate (internally and/or with other computing devices over a network) code and data using machine-readable media, such as non-transitory machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
   receiving, at a first compute server of a plurality of compute servers, a request from a client device, where the plurality of compute servers are part of a distributed cloud computing platform, and wherein the request is a request for a network resource;
   executing, by a single process at the first compute server, a nonce generator, wherein the nonce generator is run in a one of a plurality of isolated execution environments;
   locating at least one content item in response to the request for the network resource;
   detecting a first nonce value in the at least one content item;
   generating a second nonce value by the nonce generator, in response to detecting the first nonce value in the at least one content item; and
   replacing the first nonce value with the second nonce value in the content item.

2. The method of claim 1, wherein locating the at least one content item comprises:
   retrieving the at least one content item from a cache local to the first compute server.

3. The method of claim 1, wherein locating the at least one content item comprises:
   requesting the at least one content item from an origin server remote from the first compute server.

4. The method of claim 1, wherein executing the nonce generator causes at least one sub-request to be generated and transmitted to an origin server for the at least one content item.

5. The method of claim 1, wherein the replacing the first nonce value further comprises:
   determining whether to replace the first nonce value by a lookup of configuration information for the nonce generator that identifies nonce values to replace.

6. The method of claim 1, wherein the plurality of isolated execution environments execute at the first compute server.

7. The method of claim 1, wherein the nonce generator can be configured by a customer via a control server to identify nonce values to be replaced.

8. A non-transitory machine-readable storage medium of a first one of a plurality of compute servers that provides instructions that, when executed by a processor, cause the processor to perform operations comprising:
   receiving, at a first compute server of a plurality of compute servers, a request from a client device, where the plurality of compute servers are part of a distributed cloud computing platform, and wherein the request is a request for a network resource;
   executing, by a single process at the first compute server, a nonce generator, wherein the nonce generator is run in a one of a plurality of isolated execution environments;
   locating at least one content item in response to the request for the network resource;
   detecting a first nonce value in the at least one content item;
   generating a second nonce value by the nonce generator, in response to detecting the first nonce value in the at least one content item; and
   replacing the first nonce value with the second nonce value in the content item.

9. The non-transitory machine-readable storage medium of claim 8, wherein locating the at least one content item comprises:
   retrieving the at least one content item from a cache local to the first compute server.

10. The non-transitory machine-readable storage medium of claim 8, wherein locating the at least one content item comprises:

requesting the at least one content item from an origin server remote from the first compute server.

11. The non-transitory machine-readable storage medium of claim 8, wherein executing the nonce generator causes at least one sub-request to be generated and transmitted to an origin server for the at least one content item.

12. The non-transitory machine-readable storage medium of claim 8, wherein the replacing the first nonce value further comprises:
determining whether to replace the first nonce value by a lookup of configuration information for the nonce generator that identifies nonce values to replace.

13. The non-transitory machine-readable storage medium of claim 8, wherein the plurality of isolated execution environments execute at the first compute server.

14. The non-transitory machine-readable storage medium of claim 8, wherein the nonce generator can be configured by a customer via a control server to identify nonce values to be replaced.

15. A compute server, comprising:
a set of one or more processors; and
a non-transitory machine-readable storage medium that provides instructions that, when executed by the set of processors, cause the set of processors to perform the following operations:
receive a request from a client device, wherein the request is a request for a network resource;
execute, by a single process at the set of one or more processors, a nonce generator, wherein the nonce generator is run in a one of a plurality of isolated execution environments;
locate at least one content item in response to the request for the network resource;
detect a first nonce value in the at least one content item;
generating a second nonce value by the nonce generator, in response to detecting the first nonce value in the at least one content item; and
replace the first nonce value with the second nonce value in the content item.

16. The compute server of claim 15, wherein the operations further locate the at least one content item by retrieving the at least one content item from a cache local to the compute server.

17. The compute server of claim 15, wherein the operations further locate the at least one content item by requesting the at least one content item from an origin server remote from the compute server.

18. The compute server of claim 15, wherein the operations further execute the nonce generator to cause at least one sub-request to be generated and transmitted to an origin server for the at least one content item.

19. The compute server of claim 15, wherein the operations further replace the first nonce value by determining whether to replace the first nonce value by a lookup of configuration information for the nonce generator that identifies nonce values to replace.

20. The compute server of claim 15, wherein the set of one or more processors execute the plurality of isolated execution environments.

21. The compute server of claim 15, wherein the nonce generator can be configured by a customer via a control server to identify nonce values to be replaced.

* * * * *